United States Patent
Pilu

(10) Patent No.: US 7,231,100 B2
(45) Date of Patent: Jun. 12, 2007

(54) METHOD OF AND APPARATUS FOR PROCESSING ZOOMED SEQUENTIAL IMAGES

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 10/426,035

(22) Filed: Apr. 30, 2003

(65) Prior Publication Data
US 2004/0027367 A1 Feb. 12, 2004

(30) Foreign Application Priority Data
Apr. 30, 2002 (GB) ................... 0209953.9

(51) Int. Cl.
G06K 9/32 (2006.01)
G11B 27/00 (2006.01)
H04N 5/262 (2006.01)

(52) U.S. Cl. ................... 382/298; 715/723; 348/240.2

(58) Field of Classification Search ............. None
See application file for complete search history.

(56) References Cited

U.S. PATENT DOCUMENTS 5,420,632 A * 5/1995 Yamagiwa ............... 348/240.3
5,657,402 A * 8/1997 Bender et al. ............... 382/284
5,684,532 A 11/1997 Ely ............................. 348/240
5,990,947 A * 11/1999 Okino et al. ........... 348/240.99
6,750,903 B1 * 6/2004 Miyatake et al. ......... 348/218.1
6,873,358 B1 * 3/2005 Shimizu ................. 348/240.99
2002/0094026 A1 * 7/2002 Edelson ................. 375/240.01

FOREIGN PATENT DOCUMENTS

JP 01068074 A * 3/1989

OTHER PUBLICATIONS

Patent Abstracts of Japan; vol. 018, No. 069; English Abstract of JP 05 284404, Feb. 4, 1994.
Patent Abstracts of Japan; vol. 1995, No. 03, English Abstract of JP 06 350897, Apr. 28, 1995.
European Search Report of Apr. 26, 2006.

* cited by examiner

Primary Examiner—Wenpeng Chen

(57) ABSTRACT

Zoomed sequential images including a first image at a first magnification, a later image at a second magnification, and at least one intermediate image at a magnification between the first and second magnifications are processed by applying an electronic zoom to each of the intermediate images to magnify each of the intermediate images to the same size as the image size at the higher magnification level of the first and second magnifications.

21 Claims, 7 Drawing Sheets

METHOD OF AND APPARATUS FOR PROCESSING ZOOMED SEQUENTIAL IMAGES

FIELD OF THE INVENTION

The present invention relates to methods of and apparatus for processing zoomed sequential images and a computer program for controlling such processing.

BACKGROUND OF THE INVENTION

Numerous cameras are currently available that capture a sequence of images, and have a zoom feature that allows a user to progressively zoom into or out from interesting details. The zoom can be an optical zoom, a digital zoom, or a zoom comprising both optical and digital zooms. Various cameras include such zooms, including video cameras and camcorders (both analogue and digital), surveillance cameras, and digital and analogue "still" cameras that are arranged to capture sequences of still images and/or video sequences.

A zoom feature allows a camera to change from a long shot to a close-up shot (or vice versa). Historically, only an optical zoom (also termed mechanical zoom) was possible. An optical zoom normally utilizes a zoom lens in which the focal length is continuously variable while maintaining a fixed focal plane, so as to provide variable magnification of the subject.

In more recent years, electronic zooms have been developed. The electronic zooms enlarge or reduce a predetermined area of a picture by using electronic processing. This processing can be performed during the capture of the picture, or subsequently by the camera or even by utilizing post capture image processing software in editors. In many instances, electronic zooms (also referred to as digital zooms) also incorporate processing techniques to improve the image quality of the zoomed image e.g. by interpolating adjacent pixels.

While a zoom feature can be useful during filming, having a zooming action in a video sequence is normally considered bad practice. Virtually all professional and semi-professional productions (e.g. wedding videos) do not contain dramatic zooming actions in the final video. Some viewers find having a fast zoom action in a sequence to be disturbing. However, amateur users frequently tend to abuse the zoom feature and hence inevitably worsen the quality of the resulting video as perceived by a viewer.

When it is necessary to show a wide view followed by a more detailed view (or vice versa), the best practice is considered to be to change straight from the wide view to the detailed view rather than performing a zoom sequence.

Professional productions tend to utilize two or more cameras to achieve this effect, with the views suddenly switching from the camera with a wide viewing angle to a close up camera (or vice versa). This obviously requires the simultaneous use of two such cameras.

If only a single camera is utilized, then in order to achieve a change between a wide-angle view and a detailed view, the camera must zoom from one view to the other. Consequently, in order to edit the resulting image sequence to achieve an abrupt change from one view to another, it is necessary to cut out the zoom sequence and hence lose the intervening frames (and any associated audio track).

FIG. 1 is an illustration of such an editing process. Waveform 10 provides an indication of the level (i.e. amount) of the zoom of a camera as a function of time, with the frame sequence 20 illustrating the corresponding sequence of frames (A, B, C).

As can be seen, initially the camera is not zoomed in, and remains at a constant low magnification level producing frames A having a wide-angle view. Subsequently, the camera is progressively zoomed in producing frames B, until the zoom reaches an adequate level of detail after which the zoom remains constant so as to provide frames C at a constant magnified level of detail, i.e. zoom.

The resulting edited video and audio track 30 cuts directly from the wide-angle viewed frames A to the magnified viewed frames C, so as to omit the zooming action. It will thus be appreciated that the frames B containing the zooming action are lost, along with any associated audio track. Losing such information is undesirable.

EP 0853855, "Video Camera with Improved Zoom Capability", attempts to address this problem by providing a zoom camera which uses a combination of electronic (i.e. digital) zoom and optical zoom so as to obtain a rapid change in magnification, and hence minimize the period of time during which the zoom sequence exists. While this approach minimizes the duration of the zoom sequence, the zoom sequence still exists.

SUMMARY OF THE INVENTION

In a first aspect, the present invention provides a method of processing a zoomed sequence of images including a first image at a first magnification, a later image at a second magnification, and at least one intermediate image at a magnification between said first and second magnifications. The method comprises: applying a zoom to each of said intermediate images so as to magnify at least an area of each of the intermediate images to the same size as the image size of the higher of the first and second magnifications. The zoom is preferably entirely electronic to provide a facile and inexpensive way of changing, in one frame of the sequence, the zoom to cause the image size to be the same as the image size at the higher magnification level.

Preferably, the method further comprises; producing an output image sequence comprising the first image, the electronically zoomed images and the later image.

Preferably, the method further comprises: determining a subject of the image sequence that appears in said first image, said intermediate images and said later image; and wherein said intermediate zoomed images at the same sizes as the higher magnification level are arranged to comprise at least a portion of said subject.

Preferably, the method further comprises applying a soft cut image-image transition between at least one of said zoomed intermediate images and at least one of the final image and the first image.

In another aspect, the present invention provides a memory device that stores a computer program arranged to cause a processor to perform the above method.

Preferably, the program is arranged to automatically determine if a subject of the image sequence appears in said first image, said intermediate image and said later image.

In another aspect, the present invention provides an apparatus arranged to process a zoomed sequence of images having a first image at a first magnification, a later image at a second magnification, and at least one intermediate image at a magnification between said first and second magnifications. The apparatus comprises: a processor arranged to apply a zoom to each of said intermediate images so as to magnify at least an area of each of the intermediate images to the same size as the image at the higher magnification level of the first and second magnifications.

In another aspect, the present invention provides a camera comprising an apparatus as described above.

Preferably, the camera further comprises a user interface arranged for a user to select whether said apparatus operates automatically.

In a further aspect, the present invention provides an editing device arranged to edit previously captured images. The device comprises an apparatus as described above.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE PREFERRED EMBODIMENTS

Figure 1:
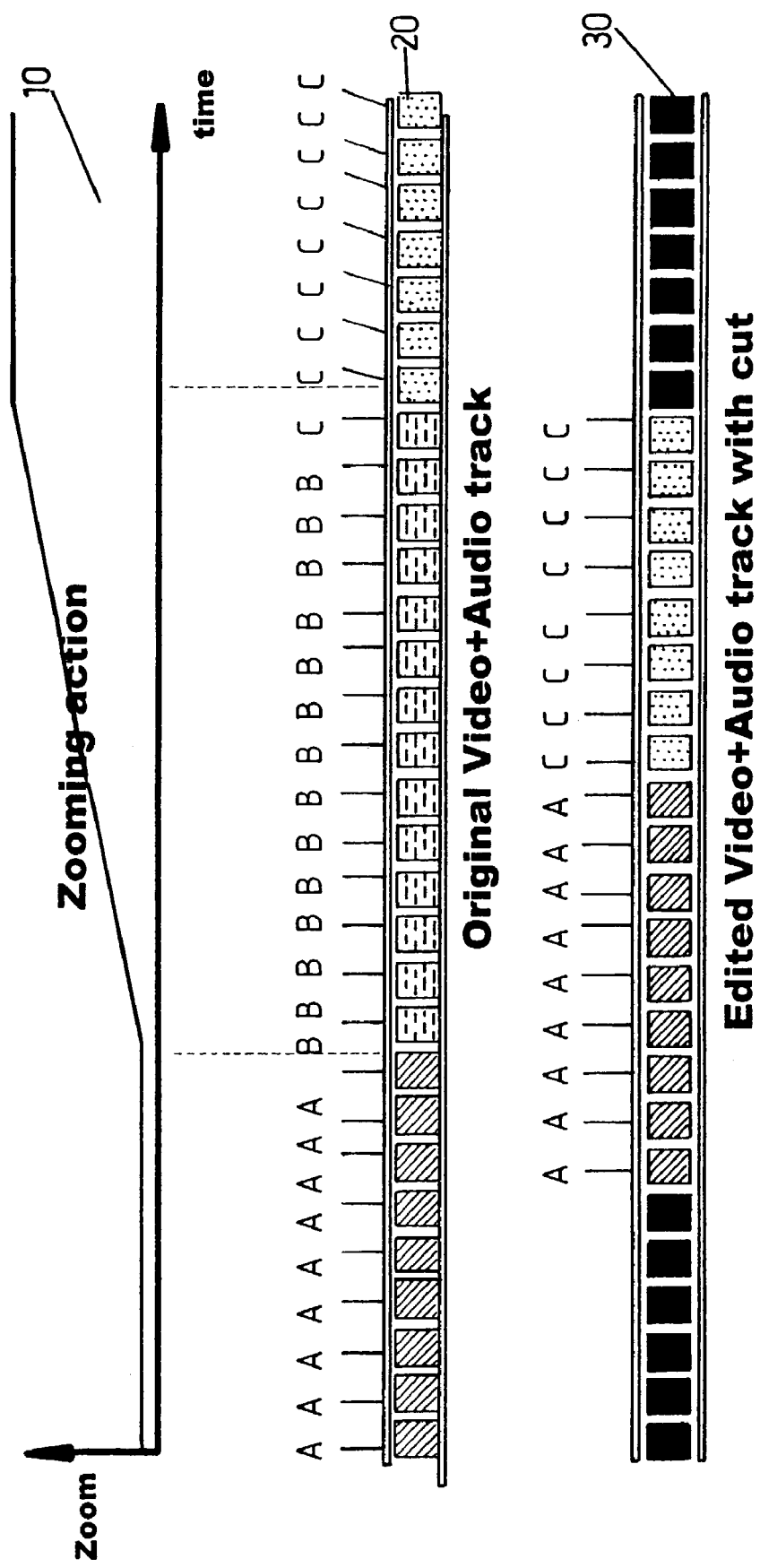
FIG. 1, as described, includes a waveform indicating image size, and sequential frames of a prior art editing sequence.
Figure 2:
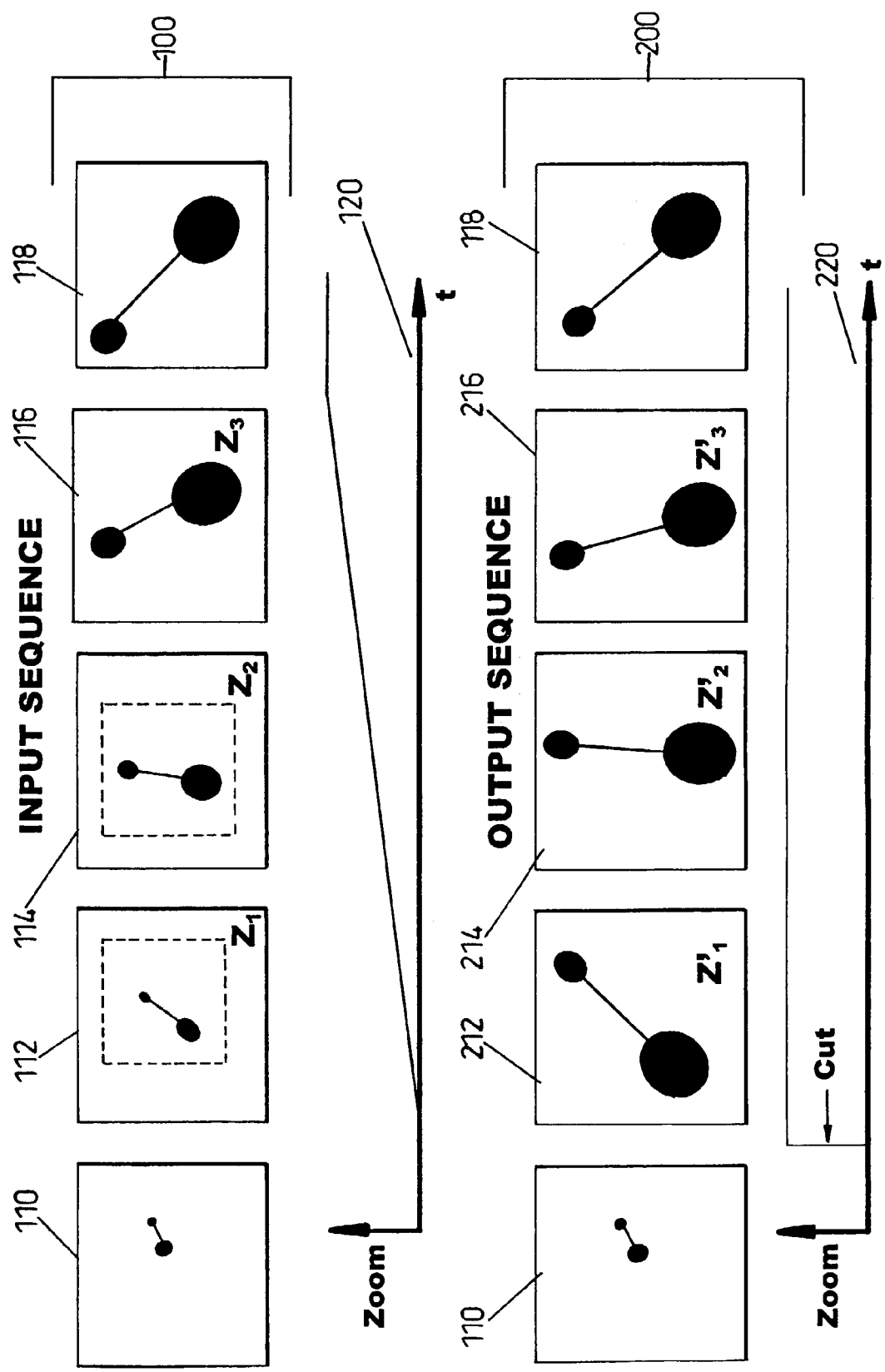
FIG. 2 includes a waveform indicating image size and sequential frames of a video editing sequence according to a first sequence using the present invention.

In FIG. 2, waveform 120 indicates a change in image size as a function of time as a camera is progressively zoomed in from a first, relatively low level of magnification to a second, higher level of magnification. The sequence 100 is an illustration of the corresponding image frames of a video camera, e.g. a camcorder, as a function of time, from the image at a low level (e.g. no) magnification 110 up to the image at the high level of magnification 118, with intermediate zooming indicated by the images of frames 112, 114, 116; the images of frames 112, 114 and 116 have progressively longer sizes.

As can be seen, the subject of the image sequence is a simple pendulum with the camera progressively zooming in on the pendulum.

Image sequence 200 illustrates the corresponding sequence of images in frames 110, 210, 214, 216 and 118 that have been processed according to an embodiment of the present invention. Waveform 220 indicates the effective size of the images of sequence 200 as a function of time. Each of the frames in sequence 200 has the same size i.e. the frames have the same area and the same aspect ratio.

As can be seen, the start image in frame 110 and the final image in frame 118 remain unchanged from sequence 100 to sequence 200. However, the camera has applied varying degrees of electronic zoom to portions of the original different sized intermediate images in frames 112, 114, 116 to produce new, processed intermediate images in frames 212, 214 and 216. The images in frames 212, 214 and 216 have the same effective size as the size of the final image in frame 118. The portions of the original image to which the electronic zoom have been applied contain the pendulum, and are illustrated by a dotted line in each of frames 112 and 114.

Consequently, the video sequence 200 containing the processed images cuts, in one frame, from the low level magnification of the image in frame 110 to higher levels of magnification of the images in frames 212, 214, 216 & 218 i.e. an abrupt change in image size occurs.

Such a technique allows a cut in a video sequence from a first level of magnification to a second level magnification without any loss in the images from the sequence or any associated audio signal. The resulting image sequence is substantially improved as the annoying zooming sequence has been eliminated and replaced by a cut, without losing any audio signal e.g. commentary or background noise and subject action.

Figure 3:
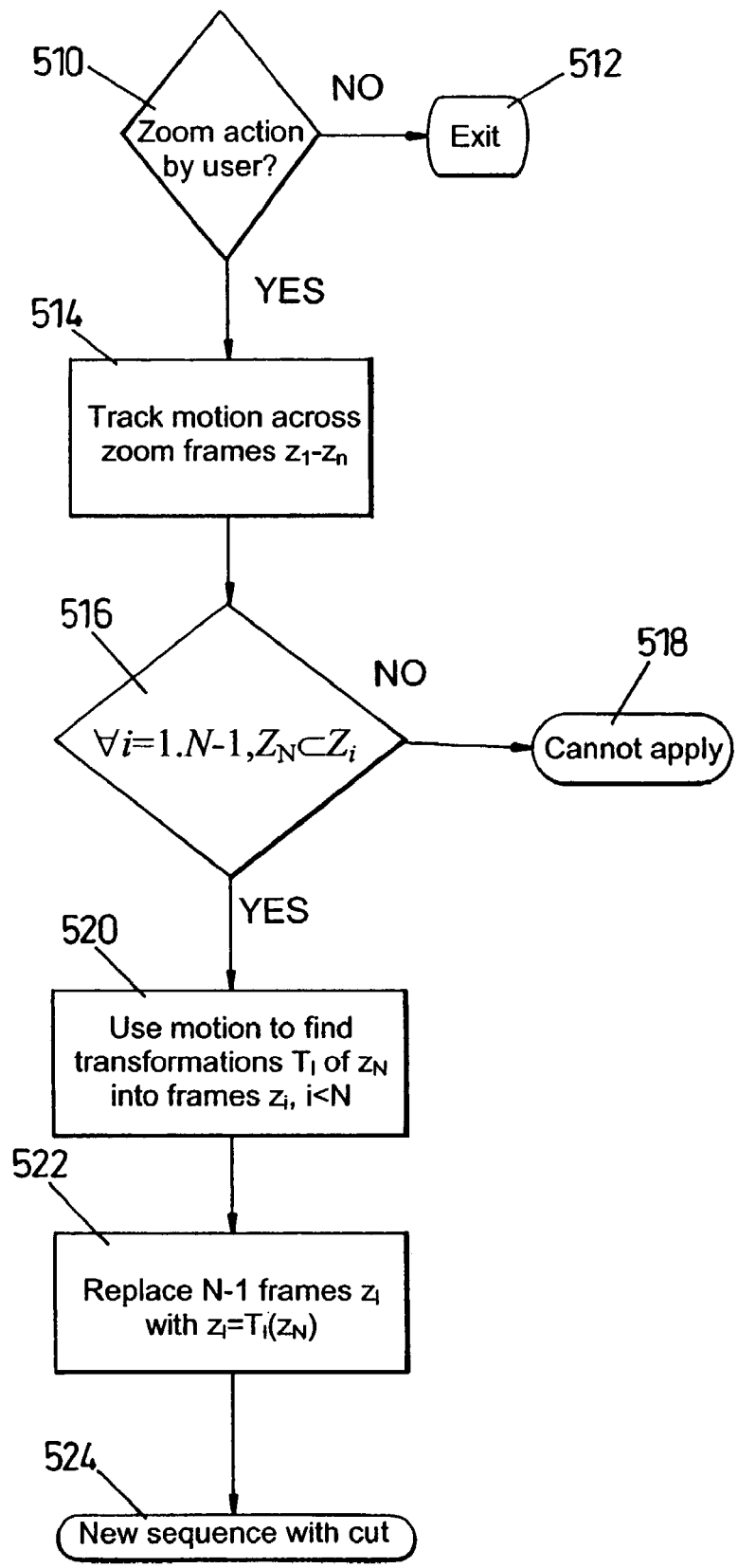
FIG. 3 is a flow chart of the steps a memory device stores, in the form of a computer program, for controlling a processor that edits the video sequence shown in FIG. 2.

FIG. 3 is a flow chart of the steps that a memory in a camera or editor stores to control a processor or ASIC that edits a sequence of images as illustrated in FIG. 2.

Firstly, the processor analyzes the images in the frame sequence 100 to determine whether there has been a zoom action (operation 510). If the processor does not detect zoom action, then no processing of the type described in connection with FIG. 2 is performed (operation 512).

In response to the processor detecting that sequence 100 has frames with zoomed images, the processor identifies the subject of the image sequence (in the example shown in FIG. 2, the subject is the pendulum). Typically, the processor determines the subject of the zoom action by looking at the objects in the frame having the highest level of magnification. The processor then tracks the motion of the subject across each of the zoom sequence frames $z_1$-$z_N$, where N is an integer (operation 514).

The processor then checks during operation 516 to ensure that the subject of the zoom sequence is in each frame of the zoom sequence. In the simplest case, the processor performs operation 516 by determining that the subject in the final frame in the zoom sequence ($z_N$) is each intermediate frame (i.e. $z_i$, where i=1 ... N).

If the processor determines that the subject is not in each frame, then the processor stops the editing procedure of FIG. 2 (operation 518).

However, if the processor determines that the subject is in each frame of the sequence, the processor advances to operation 520. During operation 520, the processor determines, for each frame $z_i$, the transformation $T_i$ required to alter the magnification of a portion of each of the zoomed frames $z_1$-$z_{N-1}$ to cause the image of the subject in each intermediate frame to have the same size as in the first or last frame having the greatest magnification, while consistently retaining the subject within each frame.

Then the processor replaces each of the intermediate frames ($z_1$-$z_{N-1}$) by corresponding frames which have undergone the transformations $T_i$ (operation 522).

This results in the processor generating a new sequence of frames (operation 524), which are effectively cut from a first level of magnification to the second level of magnification without the zoom sequence, while retaining the motion of the subject in each frame, as well as any associated audio.

It will be appreciated that the above embodiment is provided by way of example only, and that various alternatives will be considered by the skilled person to still fall within the scope of the invention.

For instance, while in the preferred embodiment the processor checks that the subject is within each frame (operation 516), and the procedure is halted if such is not the case (operation 518), it will be appreciated that the procedure could still proceed even if the subject is not within each frame. While less desirable, this would still have the effect of removing the zoom sequence from the image sequence. In such a modified sequence, the subject might be gradually panned in and out of the shot. Alternatively, the processor could generate intermediate frames so as to contain the subject, based on the frames which always include the subject.

Figure 5:
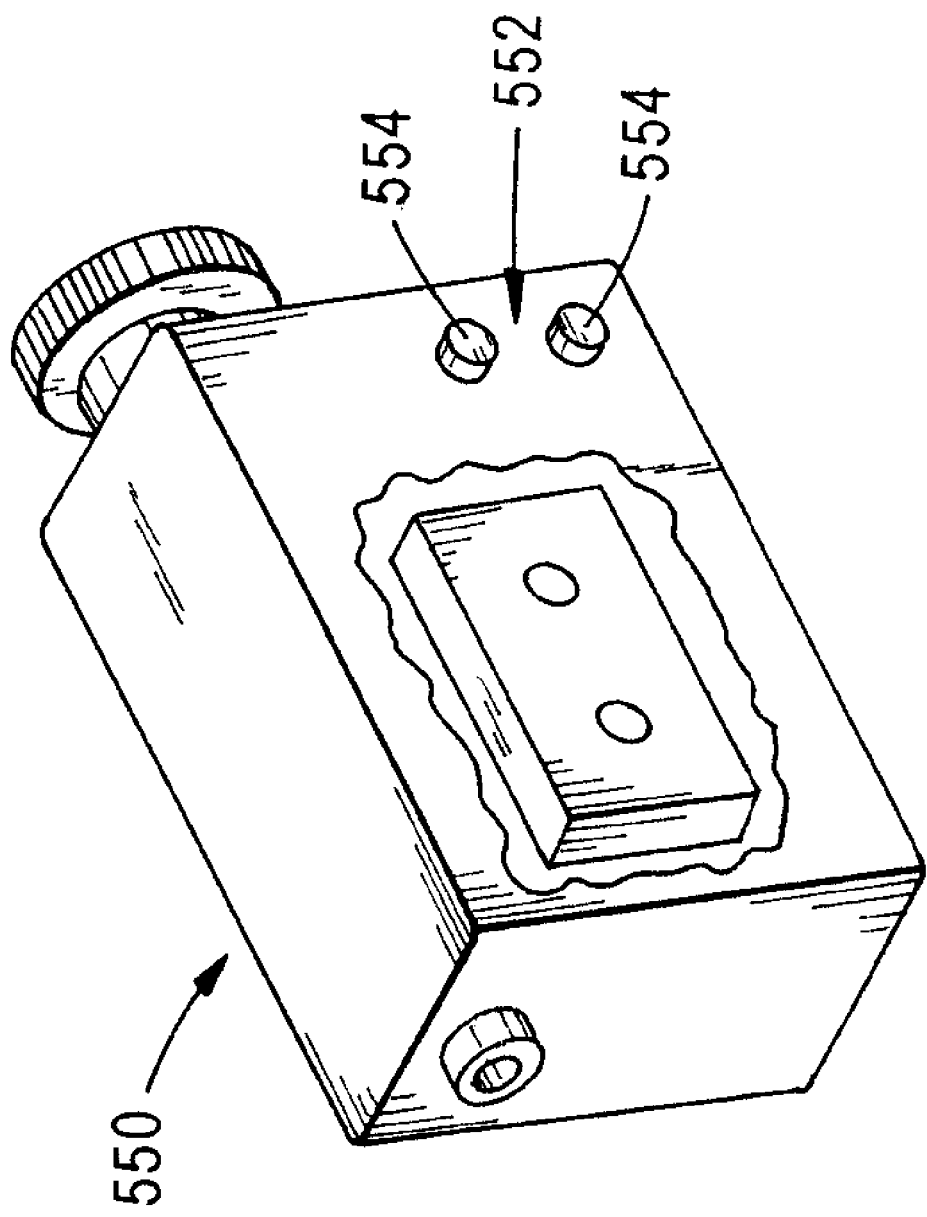
FIG. 5 is a perspective view of a video camera including a processor and memory for performing the operations of FIGS. 2, 3 and 4.
Figure 6:
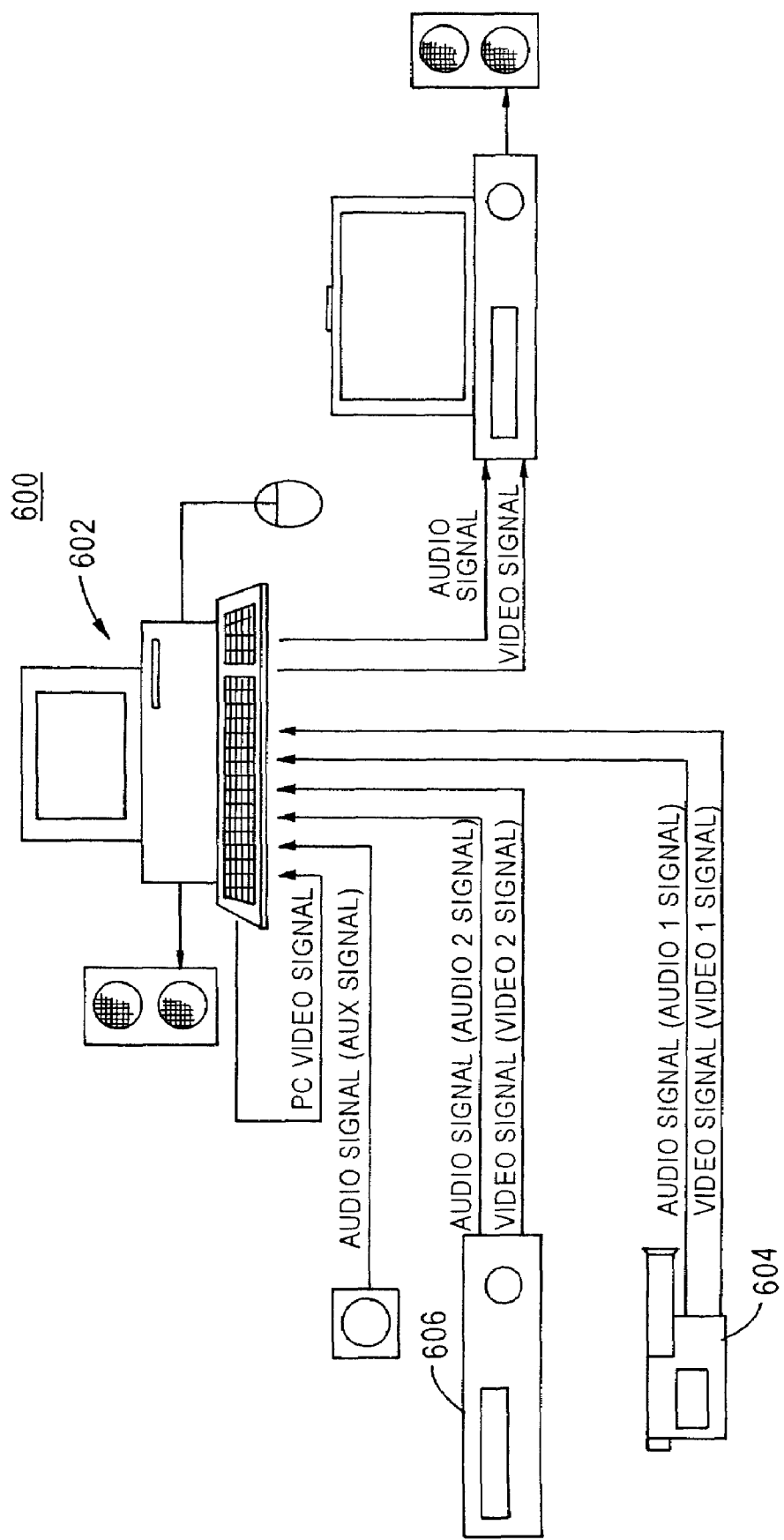
FIG. 6 is a diagram of an editor including a processor and memory for performing the operations of FIGS. 2, 3 and FIG. 4.

The present invention can be performed by using post capture editing suite 600 (FIG. 6) comprising computer 602 including a processor and memory arranged to edit a sequence of images after the images have been captured by a camera 604 or recorded by recorder 606. Computer 602 supplies the edited video signal and unedited audio signal to playback device 606 (e.g. a television receiver), either directly or in recorded form. Equally, the invention can be performed by video camera, i.e. camcorder, 550 (FIG. 5) including a processor and memory. The method can be performed automatically or in response to instructions of a user. To this end, camera 550 includes a manually activated interface 552 including buttons 554 for activating switches to cause the camera to selectively perform the operations of the flow chart of FIG. 4.

Removal of the zooming sequence can also be conducted completely automatically, or with some user intervention e.g. by the user identifying a zoom sequence or the subject of a zoom sequence.

The embodiment of FIG. 2 is an example of the resulting image-image transition, after the process associated with FIG. 2 has been applied. The FIG. 2 embodiment is a hard cut i.e. an instantaneous transition straight from an image at the first size to an image at the second, final size. One of ordinary skill will appreciate that the zoom sequence could be replaced by any image-image transition. For instance, a soft cut could be utilized to provide an image-image transition that takes a short period of time to change between the images produced by the use of an embodiment of the present invention. Examples of such other soft cut image-image transitions that can be utilized include fading (one image gradually fades into another), random dissolve, matched dissolve, blinds, wiping, and curtain.

The entire zooming sequence can be removed, or only a pre-defined portion can be used. For instance, an initial input sequence might involve gradually zooming in on a view of a car as the car approaches from a distance, and then continuing the zoom to the face of the driver of the car. A user might decide to gradually zoom in until the car fills the whole frame, and then decide to use the zoom feature of FIG. 2 to cut directly to the face of the driver.

It will be appreciated that while the invention can be applied to an image sequence that transitions from a first magnification to a second magnification and has a number of intermediate images, not all the intermediate images need be electronically zoomed. For instance, only one intermediate image, or a subset of the total number of intermediate images, can have an electronic zoom applied. This is particularly relevant to image sequences to which a soft cut image-image transition is being applied. It will be appreciated that possibly only one of the intermediate images might need to be electronically zoomed for use in the soft cut transition.

While the present invention has been described with reference to a zooming in sequence (i.e. in which the end frame is of higher magnification than the start frame), it is to be appreciated that the present invention can be applied to a zooming out sequence.

Figure 4:
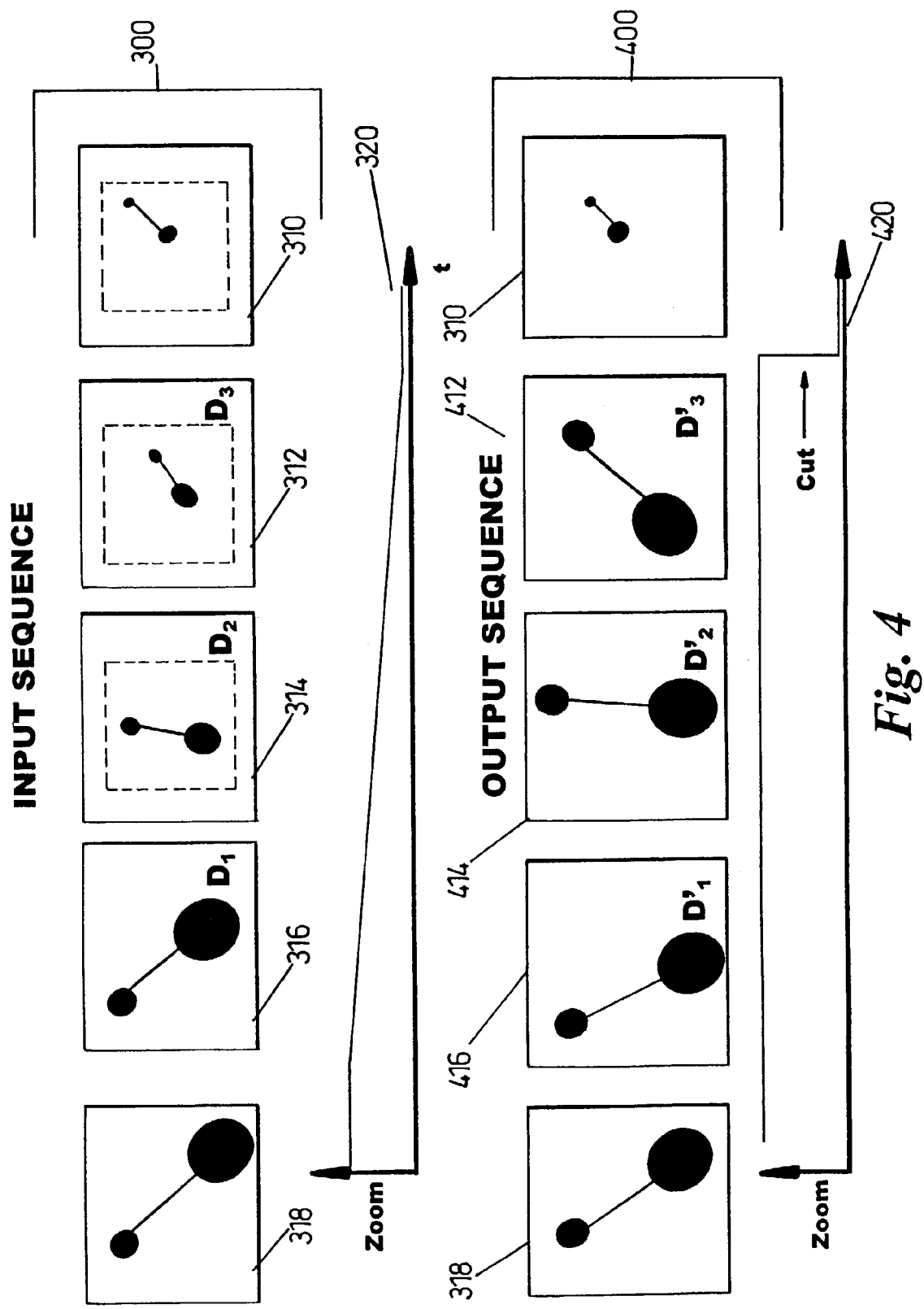
FIG. 4 includes a waveform indicating image size and sequential frames of a video editing sequence according to a second sequence of the present invention.

FIG. 4 includes a series of frames indicating operation of the device and method as applied to a zooming out image sequence 300.

Waveform 320 indicates how the zoom level (i.e. magnification) initially starts from a relatively high value, corresponding to image frame 310, and is then successively decreased as a function of time so as to zoom out from the subject during frames 312, 314, 316, to result in a low level of zoom, and a corresponding lower magnification/wider field of view in frame 318.

Image sequence 400 represents the output frame sequence that is derived from the input sequence 300. Sequence 400 is derived by processing the images in a manner similar, but opposite, to that described in connection with FIGS. 2 and 3.

As can be seen from FIG. 4, the first frame 310 and the final frame 318 are the same in sequences 300 and 400. However, the intermediate frames 312, 314, 316 (corresponding to the frames during the zooming action) of sequence 300 are replaced by respective transformed frames 412, 414 and 416 of sequence 400. Each of the transformed frames corresponds to a portion of a respective input frame that has been electronically magnified to the same magnification (i.e. zoom) level as the input frame 310. Thus, as illustrated by waveform 420, wherein the size of the subject in the processed image sequence remains constant until the final frame, at which the subject size drops to the lower level of magnification. Thus, a cut from a close up view to a wide-angle view is achieved, while retaining all audio and video action.

Figure 7:
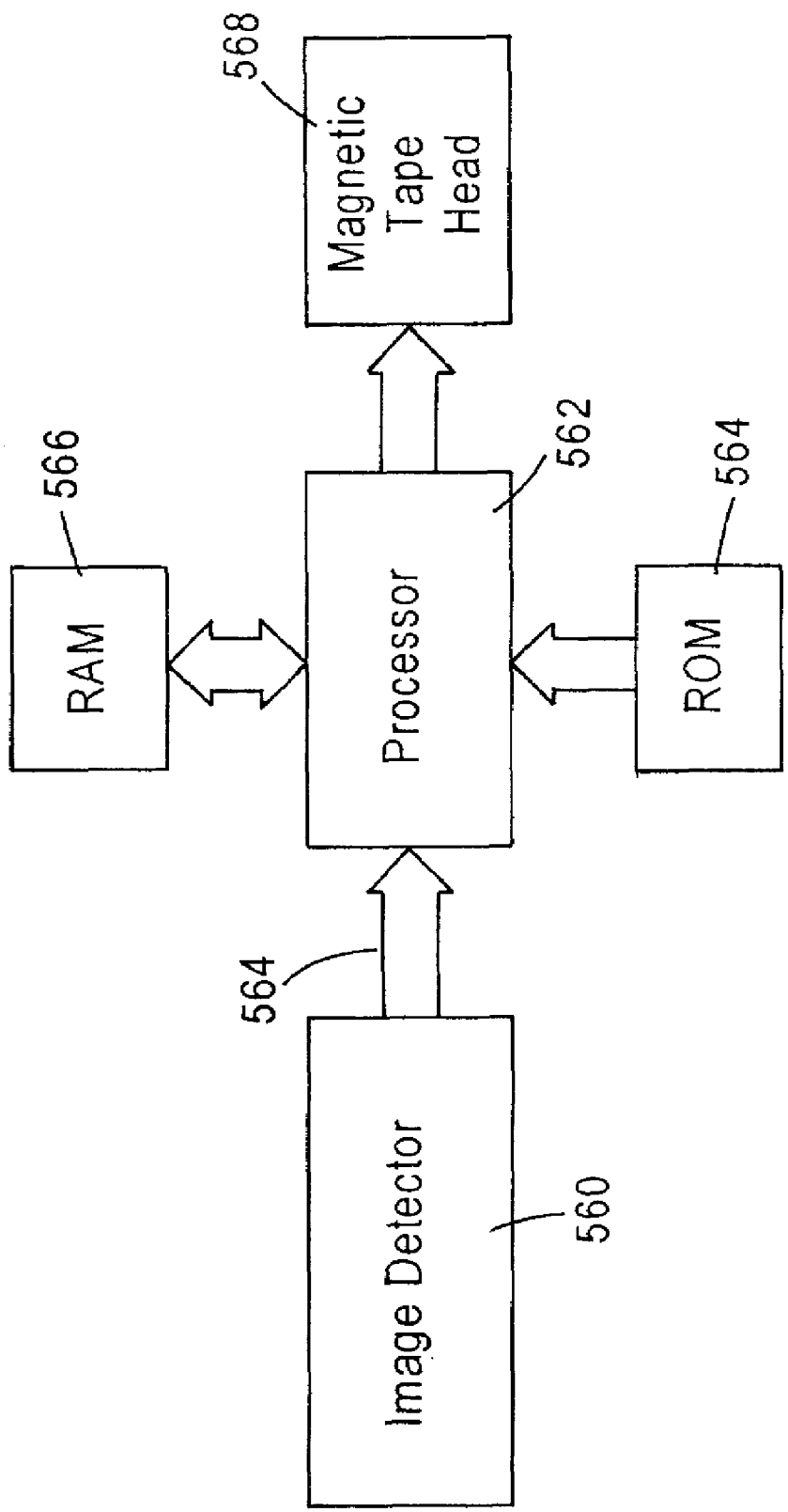
FIG. 7 is a block diagram of electronic circuitry included in the video camera or editor.

Reference is now made to FIG. 7, a block diagram of electronic circuitry camera 550 includes to obtain the results discussed in connection with FIGS. 2 and 4. Camera 550 includes electronic, digital image detector 560 that is responsive to an optical image coupled by the lens of the camera to the detector. Detector 560 supplies a digital signal indicative of the image incident on the detector to processor 562 via bus 564. Read only memory (ROM) 564 supplies processor 562 with program signals the memory stores to cause the processor to perform the operations of the flow chart of FIG. 3. Processor 562 is bi-directionally coupled with random access memory (RAM) 566 that stores signals resulting from processor 562 manipulating the signals from detector 560 under the control of the program ROM stores.

After processor 562 manipulates the signals, the processor supplies the frames which have been transformed in accordance with FIGS. 2-4, as applicable, to magnetic tape head 568 that records the transformed sequence, e.g. sequence 200 or 400, on a magnetic tape loaded in camera 550. Editor 600 includes a similar arrangement to that illustrated in FIG. 7, except that the transducer comprising image detector 560 is replaced by a magnetic read head for viewing signals from a magnetic tape including a sequence of frames that have not been transformed, e.g. sequence 100 or 300.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of processing a sequence of zoomed images including a first image at a first magnification, a later image at a second magnification, and at least one intermediate image at a magnification between said first and second magnifications, the method comprising:
   analyzing at least the first and later images of the sequence to identify the image having the higher magnification;
   after said analyzing, applying a zoom to each of said at least one intermediate image so as to magnify an area of said intermediate image to the same size as in the first or later image that has the higher magnification, thereby obtaining a processed intermediate image; and
   replacing each of said at least one intermediate image in the sequence with the corresponding processed intermediate image to obtain an output image sequence which includes, in the following order, said first image, the processed intermediate image or images, and said later image.

2. A method as claimed in claim 1, further comprising:
   automatically analyzing the images of the sequence to identify a subject of the sequence that appears in said first image, said at least one intermediate image and said later image; and
   selecting the area for zooming in each of said at least one intermediate image such that at least a portion of said subject is present in the corresponding processed intermediate image.

3. The method of claim 2, further comprising:
   applying a soft cut image-image transition between (i) at least one of said processed intermediate images and (ii) at least one of the later image and the first image.

4. The method of claim 1, further comprising:
   applying a soft cut image-image transition between (i) at least one of said processed intermediate images and (ii) at least one of the later image and the first image.

5. The method of claim 1 wherein the zoom is entirely electronic.

6. A computer-readable medium storing a computer program which is arranged to cause a processor executing said program to perform the method as claimed in claim 1.

7. The computer-readable medium of claim 6, wherein the program is arranged to cause the processor executing said program to
   analyze the images of the sequence to automatically determine if a subject of the sequence appears in said first image, said at least one intermediate image and said later image; and
   select the area for zooming in each of said at least one intermediate image such that at least a portion of said subject is present in the corresponding processed intermediate image.

8. The computer-readable medium of claim 6, wherein the program is arranged to cause the processor executing said program to automatically apply a soft cut image-image transition between (i) at least one of said processed intermediate images and (ii) at least one of the later image and the first image.

9. The computer-readable medium of claim 6 wherein the zoom is entirely electronic.

10. An apparatus arranged to process a sequence of zoomed images including a first image at a first magnification, a later image at a second magnification, and at least one intermediate image at a magnification between said first and second magnifications, the apparatus comprising:
    a processor programmed for
    receiving said sequence including the first image, the later image and said at least one intermediate image between said fist and later images,
    analyzing at least the first and later images of the received sequence to identify the image having the higher magnification,
    after said analyzing, applying an electronic zoom to each of said at least one intermediate image so as to magnify an area of said intermediate image to the same size as in the first or later image at the higher magnification, thereby obtaining a processed intermediate image; and
    replacing each of said at least one intermediate image in the sequence with the corresponding processed intermediate image to output a processed image sequence which includes, in the following order, said first image, the processed intermediate image or images, and said later image.

11. The apparatus of claim 10 wherein the zoom is entirely electronic.

12. A camera comprising the apparatus as claimed in claim 10.

13. A camera as claimed in claim 12, further comprising a user interface coupled to said processor and arranged for enabling a user to select whether said apparatus processes image sequences automatically or in response to instructions of the user.

14. The camera of claim 12 wherein the zoom is entirely electronic.

15. An editing device arranged to edit previously captured images, the device comprising the apparatus as claimed in claim 10.

16. The editing device of claim 15 wherein the zoom is entirely electronic.

17. A method of processing sequential zoomed images, the method comprising:
    analyzing a sequence of image frames to detect whether the sequence includes image frames with zoomed images;
    upon detection of a series of image frames with zoomed images, identifying a subject of the zoomed images in said series, wherein said series includes a first image frame with a first image at a first magnification, a later image frame with a second image at a second magnification, and at least one intermediate image frame with an intermediate image at a magnification between said first and second magnifications;
    selecting in each of the at least one intermediate image frame an area containing at least a portion of said subject;
    applying a zoom to the selected area of each of the at least one intermediate image frame so as to magnify said at least one portion of said subject to the same size as the size of said at least one portion of said subject in the first or later image frame having the higher of said first and second magnifications; and outputting a processed series which includes, in the following order, said first image frame, the at least one intermediate image frame after zooming, and said later image frame.

18. The method of claim 17, wherein said identifying comprises:

analyzing objects that appear in the first or later image frame having the higher of said first and second magnifications.

19. The method of claim 17, further comprising, after said identifying, tracking motion of said subject across the image frames of said series.

20. The method of claim 17, further comprising, after said identifying, checking whether said subject appears in each of the image frames of said series.

21. The method of claim 20, further comprising stopping further processing upon detection that said subject does not appear in each of the image frames of said series.

* * * * *